Patented Sept. 26, 1944

2,359,196

UNITED STATES PATENT OFFICE 2,359,196

PRODUCTION OF VINYL AROMATIC RESINS

Edgar C. Britton and Walter J. Le Fevre, Midland, Mich., assignors to The Dow Chemical Company, Midland, Mich., a corporation of Michigan No Drawing. Application July 1, 1940, Serial No. 343,438

8 Claims. (Cl. 260—91)

This invention concerns an improved method of polymerizing vinyl aromatic compounds, whereby the polymerization may be carried out rapidly to produce readily moldable resins of good quality in excellent yield.

It is known that the quality of the resins produced by polymerizing vinyl aromatic compounds is dependent to a large extent upon the conditions under which the polymerization is carried out and that by changing the polymerizing conditions the physical properties and the molding qualities may be markedly altered. Polystyrene of good toughness, appearance, and moldability is usually manufactured by heating styrene alone at temperatures between 80° and 150° C. until the reaction is substantially complete. This usual method possesses certain disadvantages. The polymerization is time consuming, from two to five days usually being required for its completion, and it requires careful temperature control, since the reaction is highly exothermic and the reaction mass is a poor conductor of heat. Also, the polymerization, when carried out in such manner, never consumes all of the styrene employed, and extra steps for removal of the monomeric styrene are necessary when a completely polymerized product is desired.

It is known that the rate of polymerization may be increased somewhat either by adding a catalyst to the styrene prior to polymerization or by carrying the polymerization out in aqueous emulsion, but these methods, as heretofore practiced, have been disadvantageous. The presence of an appreciable proportion of a polymerization catalyst in styrene during thermal polymerization of the latter causes the production of a polymer which is of lower molecular weight and more brittle than that obtained by polymerizing styrene alone under otherwise similar conditions. The product of such catalytic polymerization is usually poorly suited to the production of molded articles. Polymerization of styrene in aqueous emulsion usually produces a resin which does not flow satisfactorily during molding. Also, the polymerization reaction is unduly sluggish even when carried out in emulsion. For instance, Ostromislensky, in U. S. Patent No. 1,676,281, reports that the polymerization of styrene in an aqueous ammonia emulsion using ammonium oleate as the emulsifying agent required between 12 and 24 hours for completion even when carried out in a closed container, e. g. an autoclave, at a temperature of 140° C. In order to attain such high polymerizing temperature, the aqueous emulsion was necessarily heated at super-atmospheric pressure.

We have discovered that vinyl aromatic compounds may be polymerized rapidly and completely to produce resins which mold readily and have exceptionally good mechanical properties by carrying the polymerization out in an acidic aqueous emulsion in the presence of nascent oxygen, which is introduced in the form of a per-oxygen compound, e. g. a peroxide, as catalyst. The nascent oxygen (or the per-oxygen compound) and the acidic agent co-act to give a catalytic effect which is distinct from and superior to that obtained with either of said agents alone. However, the identity of the acid or the per-oxygen compound is of secondary importance. It is merely necessary that they be soluble or emulsifiable in the reaction mixture and that the acidic agent be a strong enough acid to bring the emulsion to a pH value below 6. Among the various catalytic agents which may be used to make up the combined catalyst are the acids: nitric acid, sulphuric acid, hydrochloric acid, hydrobromic acid, acetic acid, chloro-acetic acid, etc.; and the peroxides: benzoyl peroxide, hydrogen peroxide, ozone, sodium or potassium perborate, peracetic acid, compounds such as sodium peroxide or barium peroxide which react to form hydrogen peroxide in aqueous emulsion, etc. Excellent results are obtained using a mixture of nitric acid and hydrogen peroxide as the catalyst and this mixture is preferred. Use of our mixed catalyst permits the emulsion polymerization to be carried out rapidly at temperatures considerably lower than those employed in U. S. Patent No. 1,676,281, and at atmospheric pressure.

We have further found that although the powdered resins obtained by polymerizing vinyl aromatic compounds in aqueous emulsions may be molded directly, they mold most readily to produce articles of maximum strength and elasticity when mechanically worked at a plastifying temperature to fuse or weld the particles into a continuous body prior to molding the same. By a "plastifying temperature" is meant a temperature sufficiently high to render the resin soft and flowable. In most instances, temperatures between 125° and 225° C. plastify the vinyl aromatic resins and permit working of the same.

In producing polystyrene in accordance with the invention an aqueous emulsion containing styrene, a peroxide, an acid, and an emulsifying agent is prepared by mixing said ingredients, preferably with agitation. The identity of the emulsifying agent is of secondary importance provided, of course, that it is one forming stable emulsions with the acidic mixtures required by the invention. A variety of emulsifying agents having the necessary property of forming stable emulsions of organic compounds with dilute aqueous acids are well known. Among the various emulsifying agents which may be used are egg albumen and alkali metal sulphonates of aliphatic hydrocarbons or alkyl-aromatic hydrocarbons of high molecular weight. Nopco (a sodium salt of sulphonated sperm oil) is particularly well suited to use as the emulsifying agent.

The acid is used in a proportion sufficient to reduce the pH of the emulsion to below 6 and preferably to between 1.5 and 3. The proportions of peroxide and of the emulsifying agent may be varied widely, it being necessary merely to use the peroxide in a proportion sufficient to catalyze the polymerization and to use sufficient emulsifying agent to emulsify the styrene and water without forming an emulsion which is difficult to break after completion of the polymerization. When using a mixture of hydrogen peroxide and nitric acid as the polymerization catalyst and Nopco as the emulsifying agent, the emulsion may conveniently be prepared by adding Nopco, hydrogen peroxide, and nitric acid to water to form a solution containing between 0.1 and 2.5 per cent by weight of Nopco, between 0.25 and 1.0 per cent of hydrogen peroxide and sufficient nitric acid to reduce the pH value of the solution to below 6 and preferably between 1.5 and 3 and adding styrene in amount up to about 55 per cent of the weight of the solution and agitating until a stable emulsion is formed.

The emulsion is usually heated at temperatures between 50° and 100° C., preferably between 70° and 90° C., until the polymerization is complete, although higher polymerizing temperatures, e. g. 150° C. or higher, may be employed. The polymerization is preferably though not necessarily, carried out in a closed reactor or under an inert atmosphere, e. g. nitrogen or carbon dioxide, so as to prevent possible discoloration of the product by air. The time of heating required to obtain substantially complete polymerization usually does not exceed 10 hours and may be as short as 1 hour when operating at the higher temperatures within the range just given.

After completing the polymerization, the emulsion is broken in any of the usual ways, e. g. by heating the mixture or by adding methyl alcohol, ethyl alcohol, propyl alcohol, acetone, ammonia, or by adding water-soluble salts such as sodium-chloride or calcium chloride, etc., whereby the polymer is precipitated, usually as a powder. The precipitate is separated from the liquor, washed free of adhering mother liquor and dried. The product flows well during molding and forms molded articles of good toughness and strength. Practically quantitative yields of the polymer are obtainable from the process.

Certain modifications of the foregoing procedure are sometimes advantageous. For instance, we have found that the proportion of emulsifying agent may be adjusted so that polymer will precipitate from the emulsion as it is formed. This modification of the process permits continuous or repeated use of the same reaction medium and renders unnecessary the addition of agents after polymerization to precipitate the product. Thus during the polymerization, additional styrene may be added from time to time and the polymer which forms and precipitates may be removed periodically.

It will be understood that when operating in accordance with the modified procedure just described, an inventory of polystyrene is maintained in emulsion, i. e. precipitation of the polymer does not occur until the amount of polymer formed by the reaction exceeds that emulsifiable under the reaction conditions.

As hereinbefore stated, the powdered polystyrene prepared by the foregoing process may advantageously be mechanically worked at an elevated temperature, e. g. between 125° and 225° C., to fuse or weld together the resin particles prior to molding the same. In carrying out this operation the resin powder is heated to a temperature sufficient to render it soft and flowable and is stirred, rolled, or otherwise worked until a continuous body of resin is formed. The resin is then cut, ground, or otherwise brought to a granular form suitable for use as a molding powder.

The following examples describe certain ways in which the principle of the invention has been applied, but are not to be construed as limiting the invention.

EXAMPLE 1

The purpose of this example is to present data from two comparative experiments showing the catalytic action of a mixture of a peroxide and an acid on the polymerization of a vinyl aromatic compound in aqueous emulsion. The emulsion employed in one of the experiments consisted of 55 grams of styrene, 110 grams of water, and 1.1 grams of Nopco. The emulsion used in the other experiment contained the same amounts of the same agents, but also contained 0.275 gram of dissolved hydrogen peroxide and sufficient nitric acid to reduce the pH value of the emulsion to 2. Each emulsion was prepared by agitating the styrene with a solution of the other agents just stated. The emulsions were each heated at a temperature of 90° C. for the time stated in the following table, whereby styrene was polymerized. The polystyrene was precipitated by adding to each emulsion 3 volumes of ethyl alcohol and boiling the mixture. In each instance, the precipitated polystyrene was separated by filtration, washed with alcohol, dried, and weighed. Table I identifies the emulsions by stating whether or not the catalytic mixture of nitric acid and hydrogen peroxide was present and gives the time of heating each emulsion, the weight of polystyrene obtained, and the yield of polystyrene based on the styrene employed.

*Table I*

| Run No. | Catalyst | Hours of heating | Polystyrene | |
|---|---|---|---|---|
| | | | Grams | Percent yield |
| 1 | None | 46 | 40.2 | 75 |
| 2 | HNO$_3$ and H$_2$O$_2$ | 2 | 55 | 100 |

It will be seen that use of the catalyst increased greatly the rate of polymerization. The polymer obtained by use of the catalyst was superior to that obtained without the catalyst for molding purposes. The polystyrene obtained by the non-catalytic emulsion-polymerization did not flow satisfactorily when attempt was made to mold it in accordance with usual molding practice. Its molecular weight, as determined by the method described in Staudinger's "Die Hochmolekularen Organischen Verbindungen" published in 1932 by Julius Springer of Berlin, was about 175,000. The polystyrene obtained by the catalytic emulsion polymerization flowed well during molding and produced molded articles of good quality. Its molecular weight was approximately 125,000.

EXAMPLE 2

The purpose of this example is to compare the catalytic action of the mixture of a peroxide and an acid with the catalytic action of its individual components, i. e. the peroxide alone and the acid alone. The emulsion employed in each experiment initially contained 55 grams of styrene, 110 grams of water and 0.55 gram of Nopco. However, in one of the experiments 0.275 gram of dissolved hydrogen peroxide was used; in another experiment no hydrogen peroxide was used, but nitric acid was present in amount sufficient to reduce the pH value of the emulsion to 2; and in the third experiment both hydrogen peroxide and nitric acid in the amounts just stated were present. Each emulsion was heated at temperatures between 80° and 85° C. for 2.25 hours, after which the resultant polystyrene was precipitated, washed, dried, and weighed, as in Example 1. Table II identifies each emulsion by stating the catalyst used and gives the weight of polystyrene obtained and the yield of polystyrene, based on the styrene employed.

*Table II*

| Run No. | Catalyst | Polystyrene | |
|---|---|---|---|
| | | Grams | Percent yield |
| 1 | $HNO_3$ | 2.70 | 4.9 |
| 2 | $H_2O_2$ | 28.05 | 51.0 |
| 3 | $HNO_3$ and $H_2O_2$ | 53.08 | 96.5 |

EXAMPLE 3

Two experiments on the polymerization of orthochloro-styrene in aqueous emulsion were carried out for the purpose of testing the catalytic action of a mixture of nitric acid and hydrogen peroxide in promoting the polymerization. In one of the experiments an emulsion containing 20 grams of ortho-chloro-styrene, 40 grams of water and 0.2 gram of Nopco was heated at 90° C. for 70 minutes, after which the emulsion was treated with ethyl alcohol to precipitate the polymerized ortho-chloro-styrene and the polymer was washed with water, dried and weighed. The yield of polymer was 49.3 per cent of theoretical. In the other experiment an emulsion containing 20 grams of ortho-chloro-styrene, 40 grams of water, 0.2 gram of Nopco, 0.35 gram of a 30 per cent by weight concentrated aqueous hydrogen peroxide solution, and 2 drops of concentrated nitric acid was heated at a temperature of 90° C. for 70 minutes. The product was then separated, as in the first experiment. There was obtained 20 grams, i. e. a quantitative yield, of polymerized ortho-chloro-styrene.

EXAMPLE 4

A solution of 51 grams of Nopco and 12.15 grams of hydrogen peroxide in 11 pounds of water was agitated with 5.5 pounds of styrene until an emulsion was obtained. 4.5 cubic centimeters of concentrated nitric acid was added and the emulsion was heated in a closed container with agitation at a temperature of 90° C. for 3.75 hours. The emulsion was then treated with 10 gallons of ethyl alcohol and the mixture boiled to precipitate the polystyrene. The latter was separated by filtration, washed with alcohol, dried and weighed. There was obtained 5.5 pounds of polystyrene as a fine powder, the yield being quantitative. The product had a molecular weight of 80,000.

A portion of the powdered polystyrene product was injection molded at a temperature of approximately 175° C. to form test bars of ¼ in. by ¼ in. cross section and these test bars were used in subsequent tests to determine the impact strength and the tensile strength of the molded resin and also the elongation which it would undergo before breaking. Another sample of the powdered polystyrene was injection molded to form test bars having the dimensions of ¼ in. by ½ in. by 3 in. These test bars were prepared by injecting polystyrene simultaneously into both ends of the mold so as to form a weld in the center of the molded product. The resultant test bars were used in measuring the strength of this weld. Another portion of the polystyrene was heated to a temperature of 180° C. and stirred vigorously while at said temperature until a continuous homogeneous mass had been obtained. This mass was cut while warm into granules of size suitable for use in molding operations and the granular material was injection molded to form test bars similar to those prepared from the powdered polystyrene. The impact strength of the test pieces of ¼ in. by ¼ in. cross section was determined by a procedure similar to that described in A. S. T. M. D256–34T. The tensile strength and elongation properties were determined by applying tension to similar test pieces until breakage occurred, and measuring both the tension in pounds per square inch of original cross section of the piece required to cause breakage and the elongation of the piece which occurred before it broke. The strength of the weld in the test pieces having the dimensions ¼ in. by ½ in. by 3 in. was measured by applying tension to such test pieces until breakage at the weld occurred and measuring the tension required to cause breakage. The flow characteristics of the powdered polystyrene and also of the polystyrene which had been converted to granular form were measured by heating the polystyrene in an extrusion machine to temperature of 150° C., applying a pressure of 1,000 pounds per square inch to the heated material and thereby extruding the resin through an orifice having a diameter of 0.125 inch. The time required to extrude a polystyrene rod of 1 inch length under these conditions was determined and constituted a measure of the ability of the resin to flow during molding. Table III identifies the test pieces by stating whether they were molded from the powdered polystyrene obtained directly from the emulsion polymerization or from the granular polystyrene prepared by working the powdered material at elevated temperatures. It also gives the impact strength in inch-pounds of energy which must be delivered by a transverse blow to cause breakage; the weld strength in pounds per square inch of cross section which must be applied as tension on a test piece to cause breakage at the weld; the tensile strength in pounds per square inch required to cause breakage; the per cent of its original length by which a test piece was elongated under tension before breakage occurred and the flow characteristics of the polystyrene expressed as seconds required to extrude a 1 inch rod while applying a pressure of 1,000 pounds per square inch to the resin, and heating the latter at a temperature of 150° C.

Table III

| Form of polystyrene molded | Impact strength | Weld strength | Tensile strength | Elongation | Flow |
|---|---|---|---|---|---|
| | In.-lbs. | Lbs./sq. in. | Lbs./sq. in. | Percent | Sec./in. |
| Powdered | 6.6 | 3,300 | 7,800 | 3.6 | 54 |
| Granular | 10.0 | 6,920 | 9,130 | 5.2 | 58 |

Other vinyl aromatic resins may advantageously be prepared by polymerizing vinyl aromatic compounds, alone or together with co-polymerizing agents, in aqueous emulsions using a mixture of an acid and a peroxide as a polymerization catalyst, as hereinbefore described. Examples of such other resins preparable in accordance with the invention are the resinous polymers of para-chloro-styrene, ortho-chloro-styrene, meta-chloro-styrene, para-methyl-styrene, para-ethyl-styrene, ortho-ethyl-styrene, meta-ethyl - styrene, para - isopropyl - styrene, vinyl naphthalene, the co-polymers of styrene with di-vinyl benzene, or with di-allyl maleate, etc. In each instance the product is separated from the emulsion in the form of a fine powder, and this powder may advantageously be worked at plastifying the temperatures to fuse or weld together the particles of resin prior to molding the latter.

Other modes of applying the principle of our invention may be employed instead of the one explained, change being made as regards the details herein disclosed, provided the step or steps stated by any of the following claims or the equivalent of such stated step or steps be employed.

We therefore particularly point out and distinctly claim as our invention:

1. The method which comprises forming an aqueous acidic emulsion of a vinyl aromatic compound, which emulsion has a pH value between about 1.5 and about 3 and contains a water-soluble peroxide, and heating the emulsion to polymerize the vinyl aromatic compound.

2. The method which comprises forming an aqueous emulsion containing an acid in amount sufficient to reduce the pH value of the emulsion to between 1.5 and 3, a dissolved peroxide in amount corresponding to between 0.10 and 2.5 per cent of the weight of the water present and a vinyl aromatic compound, heating the emulsion to a temperature not exceeding 100° C. to polymerize the vinyl aromatic compound and thereafter separating the polymer from the emulsion.

3. The method which comprises forming an aqueous emulsion containing a vinyl aromatic compound, hydrogen peroxide, nitric acid in amount sufficient to reduce the pH value of emulsion to between 1.5 and 3, an emulsifying agent, heating the emulsion to a temperature not exceeding 100° C. to polymerize the vinyl aromatic compound, thereafter adding an agent to precipitate the polymer and separating the latter from the mixture.

4. The method which comprises forming an aqueous emulsion containing a vinyl aromatic compound, a dissolved peroxide, acid in amount sufficient to reduce the pH value of emulsion to between about 1.5 and about 3, and an emulsifying agent in a proportion sufficient to emulsify the vinyl aromatic compound but not a corresponding quantity of its polymer, heating the emulsion until polymerized vinyl aromatic compound precipitates therefrom, removing the precipitated polymer, and adding to the emulsion additional vinyl aromatic compound in such manner as to emulsify the latter.

5. The method which comprises polymerizing styrene while maintaining the latter in an acidic aqueous emulsion which is of a pH value between about 1.5 and about 3 and contains a dissolved peroxide.

6. The method which comprises forming an aqueous emulsion which contains styrene, a dissolved peroxide, an acid in amount sufficient to reduce the pH value of the emulsion to between about 1.5 and about 3 and an emulsifying agent, heating the emulsion to polymerize the styrene and separating polystyrene from the emulsion.

7. The method which comprises forming an aqueous emulsion containing styrene, hydrogen peroxide, nitric acid in amount sufficient to reduce the pH value of the emulsion to between 1.5 and 3 and an emulsifying agent, heating the emulsion to polymerize the styrene and separating polystyrene from the emulsion.

8. The method which comprises polymerizing a vinyl aromatic compound while maintaining the latter in an acidic aqueous emulsion which is of a pH value between about 1.5 and about 3 and contains a dissolved peroxide, separating the polymerized vinyl aromatic compound from the emulsion as a powder, heating the powdered polymer to a plastifying temperature and working the same while hot to reduce it to a continuous mass, and subdividing the mass into granules suitable for use as a molding powder, whereby the polymer is obtained in a condition such that it may be molded into articles of greater strength than are obtained by similarly molding the unworked powdered polymer.

EDGAR C. BRITTON.
WALTER J. LE FEVRE.